(12) United States Patent
Oles et al.

(10) Patent No.: US 8,314,039 B2
(45) Date of Patent: Nov. 20, 2012

(54) HYDROPHILIC SURFACES

(75) Inventors: Markus Oles, Hattingen (DE); Edwin Nun, Billerbeck (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 10/506,813

(22) PCT Filed: Jan. 23, 2003

(86) PCT No.: PCT/EP03/00642

§ 371 (c)(1),
(2), (4) Date: Jan. 12, 2005

(87) PCT Pub. No.: WO03/074194

PCT Pub. Date: Sep. 12, 2003

(65) Prior Publication Data

US 2005/0118911 A1     Jun. 2, 2005

(30) Foreign Application Priority Data

Mar. 7, 2002   (DE) .................................. 102 10 027

(51) Int. Cl.
*B32B 5/16* (2006.01)
(52) U.S. Cl. .......................... 442/118; 977/773; 428/332
(58) Field of Classification Search ............. 977/DIG. 1, 977/773, 778; 442/417, 118; 428/400, 332
See application file for complete search history.

(56) References Cited

U.S. PATENT DOCUMENTS

| | | | |
|---|---|---|---|
| 4,421,789 A * | 12/1983 | Kaneko et al. ................. | 427/204 |
| 4,701,345 A * | 10/1987 | Giatras et al. ................. | 427/521 |
| 6,337,129 B1 * | 1/2002 | Watanabe et al. ............. | 428/328 |
| 2001/0023159 A1 * | 9/2001 | Chen et al. .................... | 442/394 |
| 2003/0013369 A1 * | 1/2003 | Soane et al. ................... | 442/181 |
| 2004/0023824 A1 * | 2/2004 | Zuechner et al. ............. | 510/276 |

FOREIGN PATENT DOCUMENTS

| | | |
|---|---|---|
| EP | 1 095 760 A1 | 8/2000 |
| EP | 1 166 860 A2 | 1/2002 |
| EP | 1 254 941 A1 | 11/2002 |
| FR | 2 147 839 | 3/1973 |
| FR | 2 385 538 | 10/1978 |

(Continued)

OTHER PUBLICATIONS

"Fumed Silica", Handbook of Fillers-A Definitive User's Guide and Databook (2nd Edition) Published in 2000, pp. 131-137.*

*Primary Examiner* — Matthew Matzek
(74) *Attorney, Agent, or Firm* — Smith, Gambrell & Russell, LLP

(57) ABSTRACT

The invention relates to surfaces with hydrophilic properties and a method for producing such surfaces. Surfaces are provided with hydrophilic properties by applying a coating containing hydrophilic silicic acid by means of the inventive method. Said surfaces can be textile or polymer surfaces, metallic or wooden surfaces. The silicic acid can be permanently connected to the polymer surface or be in the form of a non-fixed coating. The inventive hydrophilic silicic acid is applied in a very simple manner by applying a suspension containing silicic acid particles in a solvent on the corresponding surface, whereupon the solvent is removed or the silicic acid particles are fixed to the surface by means of a carrier. Condensing devices of dehumidifiers, foams or sponges are examples of surfaces that can be provided with the inventive hydrophilic surfaces.

5 Claims, 3 Drawing Sheets

FOREIGN PATENT DOCUMENTS

Figure 1A:
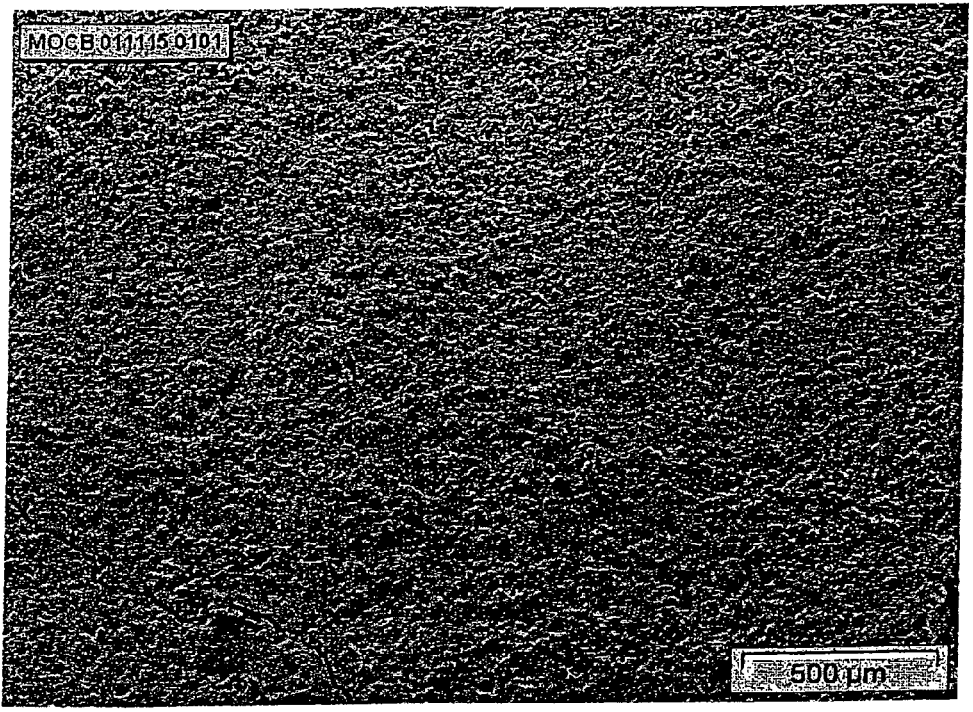
Figure 1B:
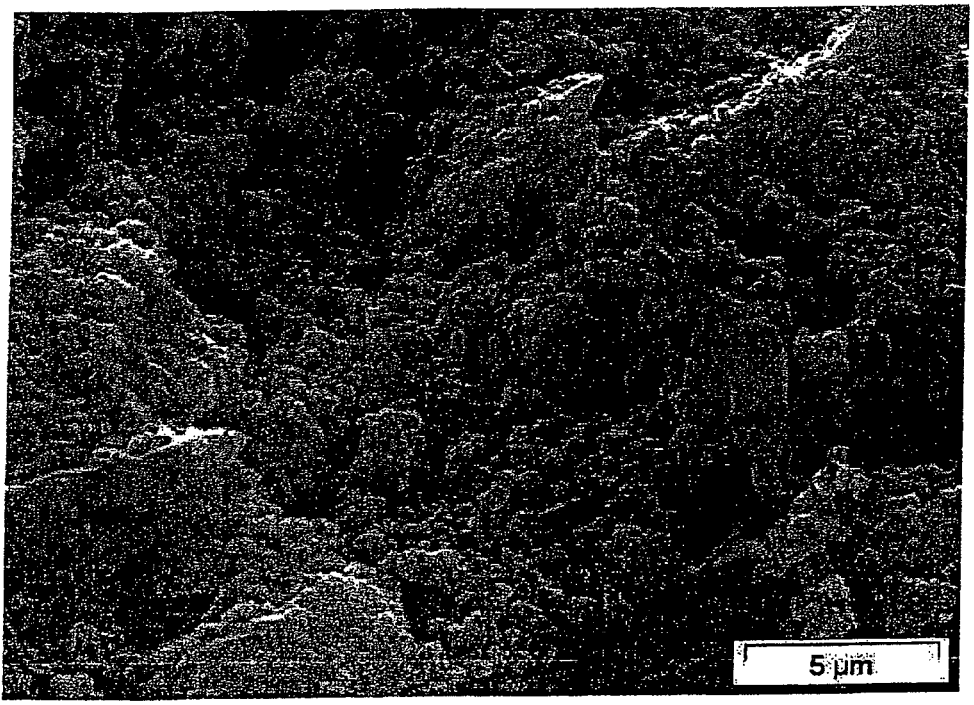

| | | |
|---|---|---|
| GB | 833284 | 4/1960 |
| JP | 3-294573 | 12/1991 |
| JP | 4-202848 | 7/1992 |
| JP | 5-70625 | 3/1993 |
| JP | 9-194234 | 7/1997 |
| JP | 2002-161240 A | 6/2002 |
| WO | WO 93/08236 | 4/1993 |
| WO | WO 01/83662 A1 * | 11/2001 |
| WO | WO 0183662 A1 * | 11/2001 |
| WO | WO 01/96511 A2 | 12/2001 |
| WO | WO 01/96512 A2 | 12/2001 |
| WO | WO 02/084016 A1 | 10/2002 |

* cited by examiner

HYDROPHILIC SURFACES

The present invention relates to surfaces with hydrophilic properties, to a process for producing these surfaces, and also to their use.

Various processes for treating surfaces are known in surface technology and provide these surfaces with dirt- and water-repellency. For example, it is known that if good self-cleaning of a surface is to be achieved the surface has to have a certain degree of roughness and also has to be highly hydrophobic. A suitable combination of structure and hydrophobic properties permits even small amounts of water set in motion on the surface to entrain adherent dirt particles and clean the surface (WO 96/04123; U.S. Pat. No. 3,354,022). Here, what is known as the Lotus effect makes use of the properties of hydrophobic and structured surfaces to give extremely effective run-off of water droplets from these surfaces.

However, a disadvantage of the hydrophobic surfaces is that if the structures are sufficiently complicated, e.g. moldings with undercuts or porous moldings, e.g. sponges, water cannot then penetrate these voids, the result being that no cleaning takes place. In addition, the globular shape of the water droplets on these surfaces can cause visual impairment if the droplets do not roll off from the surface because the surface is, for example, horizontal. In such instances, highly wettable surfaces are advantageous, since a water droplet on these becomes distributed over almost the entire surface and forms a film of minimum thickness. This occurs in particular if the surface tension of the water is reduced by appropriate means, e.g. surfactants, and/or a hydrophilic surface is present.

Continuing reduction of surfactant consumption is desirable in order to protect the environment. The hydrophilic surfaces may be produced by a wide variety of processes. A process particularly frequently used is treatment of the surface of polymers with a plasma. Use may be made here of either microwave plasmas or of low-pressure plasmas. Depending on the gas used for operations, different effects can be produced. To produce hydrophilic surfaces, particularly suitable plasmas are oxygen plasmas, $CO_2$ plasmas, NO plasmas, and $NO_2$ plasmas. If oxygen is used, the polymer surfaces are modified so as to form functional groups, such as hydroxy, carbonyl, carboxy, and peroxide groups. The use of nitrogen and ammonia promote the formation of amine functions and imine functions. These polar, hydrophilic groups drastically alter chemical properties and improve the wettability of these surfaces. The hydrophilic surfaces have contact angles of a few degrees.

However, the plasma processes are complicated and can be used only in relation to polymeric surfaces. In addition, the hydrophilic surface which can be produced does not have very high stability. It was therefore an object of the present invention to provide surfaces with hydrophilic properties, and also a process for their production. The use of plasmas should be dispensed with here, and the restriction to certain surface materials should likewise be overcome.

Surprisingly, it has been found that surfaces with hydrophilic properties can be produced very simply if hydrophilic particles are applied to these surfaces and then secured. This securing process can take place in many different ways, e.g. by using adhesives or the like as carriers, by simply utilizing adhesive forces, or by solvating or swelling the surface, embedding the particles, and then curing the surface.

The present invention therefore provides surfaces with hydrophilic properties, wherein the surfaces comprise particles with hydrophilic properties.

The present invention also provides a process for producing surfaces with hydrophilic properties, which comprises applying particles which have hydrophilic properties to a surface and securing them there.

The present invention also provides articles which have, on at least one surface, a surface of the invention with hydrophilic properties.

The present invention also provides cleaning textiles and fibers which have, on at least one surface, a surface of the invention with hydrophilic properties, and also textiles which comprise these fibers.

Surfaces of the invention have the advantage of being very readily water-wettable, even without addition of surfactants to the water. This is particularly advantageous in the case of cleaning textiles, cleaning sponges, or cleaning foams, since the absorption of water into these cleaning aids is markedly facilitated and also increased by a simple wetting process.

The surfaces of the invention may be produced very easily. In particular, it is also possible to equip very complicated three-dimensional articles with hydrophilic surfaces.

The process of the invention and the surfaces of the invention are described by way of example below without any intention that the invention be restricted to these.

The surfaces of the invention with hydrophilic properties comprise particles with hydrophilic properties. These particles are preferably hydrophilic silica particles. In order that the hydrophilic properties of the surfaces of the invention are effective, these preferably have sufficient hydrophilic particles to form from 10 to 100%, preferably from 50 to 95% and very particularly preferably from 75 to 85%, of the surface of the invention.

The surfaces themselves may be the surfaces of articles made from metals, from plastics, or from polymers, wood, ceramics, or glass. These surfaces may in particular also be surfaces made from metal, wood, ceramics, or glass which have been coated with plastics or with polymers.

The form in which the hydrophilic particles are present is particularly preferably that of primary particles with an average particle size of from 1 nm to 20 µm, preferably from 5 nm to 5 µm, and very particularly preferably from 12 nm to 1 µm. These primary particles may also be present in the form of agglomerates or aggregates, these aggregates or agglomerates having particle sizes of from 20 nm to 100 µm. According to DIN 53 206, aggregates have (primary) particles in edge- or surface-contact, while agglomerates have (primary) particles in point-contact.

Particular preference is given to hydrophilic particles with a BET surface area of from 50 to 600 $m^2/g$. Very particular preference is given to the use of particles which have a BET surface area of from 50 to 380 $m^2/g$.

Examples of hydrophilic silicas of the invention are marketed by the company Cabot with the name CAP-O-Sil. Surfaces of the invention may comprise the grades LM 150, M-5, H-5, EH-5, M-7D, for example. These hydrophilic silicas from the company Cabot have a BET surface area of from 150 to 380 $m^2/g$. These silica grades are often utilized for rheological applications. Fumed hydrophilic silicas known as Aerosil grades from the company Degussa are equally suitable. Surfaces of the invention may therefore also comprise these hydrophilic Aerosils, e.g. Aerosils called Aerosil OX 50, 90, 130, 150, 200, 300, and/or 380.

The hydrophilic particles may simply adhere to the surface by chemical or physical adhesion. The hydrophilic particles may particularly preferably have been secured to the surface, e.g. by means of a carrier. The carriers preferably present at the surfaces of the invention are known adhesive systems or lacquer systems. Examples of these carriers are hot-melt adhesives which comprise at least one compound selected from ethylene/ethyl acrylate copolymers, ethylene/vinyl acetate copolymers, polyamides, polyether sulfones, polyisobutenes, and polyvinyl butyrals, or lacquers which comprise at least mixtures made from mono- and/or polyunsaturated acrylates and/or methacrylates and/or polyurethanes. It can be advantageous for the thickness of the carrier layer used not to exceed half of the average primary particle size of the particles present.

However, it is also possible for the hydrophilic particles to have been anchored in the surface. In this mode of securing the particles, the particles have at least to some extent been set into the surface. This method of securing the particles is successful only with surfaces or surface coatings made from polymers or from plastics.

The surfaces of the invention are preferably produced by the process of the invention for producing surfaces with hydrophilic properties. This comprises applying hydrophilic particles to a surface and securing them there.

Hydrophilic particles whose use is particularly preferred have an average primary particle size of from 1 nm to 20 μm, preferably from 5 nm to 5 μm, and very particularly preferably from 12 nm to 1 μm. These primary particles may also be present in the form of agglomerates or aggregates, these aggregates or agglomerates having particle sizes of from 20 nm to 100 μm. According to DIN 53 206, aggregates have (primary) particles in edge- or surface-contact, while agglomerates have (primary) particles in point-contact. Particular preference is given to hydrophilic particles with a BET surface area of from 50 to 600 $m^2/g$. Very particular preference is given to the use of particles which have a BET surface area of from 50 to 380 $m^2/g$.

The hydrophilic particles used in the process of the invention preferably comprise hydrophilic silicas. Examples of hydrophilic silicas of the invention are marketed by the company Cabot with the name CAP-O-Sil. Examples of particular grades which may be used in the process of the invention are CAP-O-Sil LM 150, M-5, H-S, EH-5, and/or M-7D. These hydrophilic silicas from the company Cabot have a BET surface area of from 150 to 380 $m^2/g$. These silica grades are often utilized for Theological applications. Fumed hydrophilic silicas known as Aerosil grades from the company Degussa are equally suitable. Examples of particular hydrophilic Aerosils which may be used in the process are Aerosil OX 50, 90, 130, 150, 200, 300, and/or 380.

In one embodiment of the process of the invention, the hydrophilic particles are applied and secured to the surface by applying a suspension which comprises hydrophilic particles in a solvent, and then removing the solvent. One way of applying the suspension to at least one surface of an article is to dip the article into the suspension, or to use applications of the suspension to the article by spray, spreader, or doctor. It can be advantageous for the suspension to comprise a polymer dissolved in the solvent. The solvent preferably comprises less than 10% by weight of dissolved polymer, preferably from 0.1 to 5% by weight, and very particularly preferably from 0.5 to 2.5% by weight of dissolved polymer.

The suspension may be prepared in a manner known to the skilled worker, e.g. by simply mixing the silica into the solvent. The suspension used according to the invention preferably comprises from 0.1 to 50% by weight, with preference from 0.5 to 25% by weight, particularly preferably from 0.5 to 5% by weight, from 5 to 10% by weight, from 10 to 15% by weight, from 15 to 20% by weight, or from 20 to 25% by weight, and very particularly preferably from 1 to 2.5% by weight, of hydrophilic particles in the solvent, based on the solvent.

In the event that the surface of the article is not solvated by the solvent, a method of securing the particles consists in adhesion of the particles as a coating on the surface of the article after removal of the solvent. However, if a dissolved polymer is present in the suspension, the particles may have been secured to the surface via a thin polymer film which develops, the polymer film being developed through removal of the solvent.

The solvent used comprises at least one suitable compound from the group consisting of alcohols, glycols, ethers, glycol ethers, ketones, amides, nitro compounds, halogenated hydrocarbons, and mixtures of these, which does not solvate the article to be coated. A suitable solvent has to be selected, depending on the surface to be treated and on the polymer to be dissolved in the suspension.

In the case of a surface made from metal, glass, ceramics, or wood, an example of a suitable solvent is tetrahydrofuran. An example of a dissolved polymer which may be present therein is polystyrene. Suitable combinations of materials can also be found for surfaces made from plastic. For example, polymer surfaces made from high-pressure polyethylene (LDPE) can likewise be treated with a suspension which comprises tetrahydrofuran as solvent. In this instance, again, the suspension may in turn comprise polystyrene as dissolved polymer. Polyvinyl chloride surfaces are accessible to suspensions using cyclohexanone as solvent.

In another embodiment of the process of the invention, the surface of the article is swelled or solvated by the solvent, and after removal of the solvent the particles have been anchored in the surface of the article.

Examples of surfaces which can be solvated or swelled are those which comprise polymers based on polycarbonates, on poly(meth)acrylates, on polyamides, on PVC, on polyethylenes, on polypropylenes, on aliphatic linear or branched polyalkenes, on cyclic polyalkenes, on polystyrenes, on polyesters, on polyether sulfones, on polyacrylonitrile, or on polyalkylene terephthalates, or else comprises mixtures or copolymers of these. The surface of the moldings made from the polymers mentioned may be present inherently if the molding has been manufactured entirely from this material. However, the polymers may also be applied as a coating to other materials. For example, moldings made from glass or metal can be equipped entirely or to some extent with a surface made from one of the polymers mentioned, e.g. by dipping into a polymer melt followed by solidification of the melt, or by applying a reactive polymer adhesive or powder coating, and hardening the adhesive/coating on the molding.

The suitable compound used as solvent or swelling agent for the appropriate surface is preferably one selected from the group consisting of alcohols, glycols, ethers, glycol ethers, ketones, amides, nitro compounds, halogenated hydrocarbons, and mixtures of these.

Particularly suitable solvents used as solvents for the appropriate surface are preferably compounds selected from methanol, ethanol, propanol, butanol, octanol, cyclohexanol, phenol, kresol, ethylene glycol, diethylene glycol, dioxane, dioxolane, tetrahydrofuran, monoethylene glycol ether, diethylene glycol ether, triethylene glycol ether, polyethylene glycol ether, acetone, butanone, cyclohexanone, glycol ester, dimethylformamide, pyridine, N-methylpyrrolidone, N-methylcaprolactone, acetonitrile, dimethyl sulfoxide, sulfolane, nitrobenzene, dichloromethane, chloroform, tetra-chloromethane, trichloroethene, tetrachloroethene, 1,2-dichloroethane, and chlorophenol and chlorofluorocarbons, and mixtures of these.

On solvation of the surface, a liquid zone with a high proportion of dissolved polymer forms at the surface. Particles which become embedded at the surface in this zone are secured to the surface by the solidifying (precipitating) polymer on removal of the solvent. In this embodiment of the process of the invention, too, it can be advantageous for the suspension to comprise a dissolved polymer. It is particularly preferable for the dissolved polymer to be the same as the polymer of the surface.

In order to avoid any relatively extensive destruction of the surface, it is important to take care to avoid any excessive period of exposure of the surface to the suspension. In this version of the process of the invention, the inventive treatment of the surface preferably takes place by dipping the article/the surface into the solvent which comprises the particles. The duration of the dipping process depends on the rate of solvation of the polymer in the solvent, but is preferably less than 5 minutes, with preference from 1 second to 5 minutes, particularly preferably from 1 to 20 seconds, or from 20 seconds to 1.5 minutes, or from 1.5 to 2 minutes. It is very particularly preferable for the dipping of the surface into the solvent to take from 5 to 15 seconds. Once the articles have been dipped into the solvent, they are removed from the solvent and dried.

One version of the process consists in the swelling of the surfaces. Suitable swelling agents do not solvate a polymer surface. Instead, the surface becomes undefined in a strict sense via embedding of solvent molecules, and becomes soft. This permits at least some penetration into the surface of particles as claimed in this application, as well as solvent molecules. The compounds to be used as swelling agents are therefore those which are poor solvents for the polymer to be treated, therefore requiring markedly more time than good solvents for the solution process, or else solvents whose solvent power has been reduced by addition of non-solvent. The result is that the only macroscopic effect taking place is swelling of the uppermost polymer layers. This method also avoids entire or partial breakaway of the surface of the plastic or of the polymer.

Another way of obtaining suitable swelling agents can consist in mixing non-solvents. For example, atactic polystyrene is soluble neither in acetone nor in cyclohexane. However, if these two non-solvents are mixed, mixing ratios which swell polystyrene are rapidly obtained. Indeed, mixing ranges within which atactic polystyrene is dissolved can be reached.

After completion of the swelling process or of the swelling procedure and of subsequent drying, the particles which form the surface structures composed of elevations have been embedded securely into the upper polymer layers accessible to the swelling agent. The subsequent removal of the swelling agent reverses the swelling process, and the particles have been securely anchored in the polymer surface. The swelling of the surfaces is therefore an indispensable feature of the process of the invention for producing moldings with self-cleaning surfaces free from any carrier layer.

The swelling agent used may comprise at least one compound selected from the group consisting of alcohols, glycols, ethers, glycol ethers, ketones, amides, nitro compounds, halogenated hydrocarbons and mixtures of these which is a suitable swelling agent for the appropriate surface. It is also possible to use mixtures of the swelling agents mentioned with hydrophobic solvents, such as aliphatic hydrocarbons. The swelling agent used preferably comprises at least one compound which is a suitable swelling agent for the appropriate surface selected from methanol, ethanol, propanol, butanol, octanol, cyclohexanol, phenol, kresol, ethylene glycol, diethylene glycol, dioxane, dioxolane, tetrahydrofuran, monoethylene glycol ether, diethylene glycol ether, triethylene glycol ether, polyethylene glycol ether, acetone, butanone, cyclohexanone, glycol ester, dimethylformamide, pyridine, N-methylpyrrolidone, N-methylcaprolactone, acetonitrile, dimethyl sulfoxide, sulfolane, nitrobenzene, dichloromethane, chloroform, tetra-chloromethane, trichloroethene, tetrachloroethene, 1,2-dichloroethane, chlorophenol and chlorofluorocarbons, and mixtures of these, and mixtures of these swelling agents with a compound selected from petroleum spirits, petroleum ether, cyclohexane, methyl cyclohexane, decalin, tetralin, terpenes, benzene, toluene, and xylene.

For amorphous polymers, a prediction of a swelling agent may be made using the solubility parameters for the polymers and for the solvents. Solubility parameters are tabulated in the book "Makromoleküle", Hüthig & Wepf Verlag Basel-Heidelberg-New York by Hans-Georg Elias (1981). An aid to prediction of the solution process has been given. Swelling occupies the border region between solution and non-solution. The solubility parameter concept cannot be utilized in order to discover swelling agents for crystalline or semicrystalline polymers at temperatures below the crystallite melting point. To discover the swelling agent here, use may be made of simple experiments based on the nature of the solvent and the effect of temperature.

By way of example, the table below gives some combinations of swelling agent and polymer which are suitable for use in the process of the invention. Other combinations will be readily apparent to the skilled worker.

| Swelling agent | Polymer |
| --- | --- |
| Tetrahydrofuran:ethanol 60:40 (% by weight) | Polystyrene |
| Decalin:N-methylpyrrolidone 90:10 (% by weight) | Polyethylene |
| Decalin:cyclohexanone 50:50 (% by weight) | Polyethylene |
| Decalin:cyclohexanone 50:50 (% by weight) | Polypropylene |
| Decalin:tetrahydrofuran 50:50 (% by weight) | Polypropylene |
| Decalin:N-methylpyrrolidone 90:10 (% by weight) | Polypropylene |
| Cyclohexanone:ethanol 20:80 (% by weight) | Polyvinyl chloride |
| Cyclohexanone:tetrahydrofuran 20:80 (% by weight) | Polyvinyl chloride |

Simple testing will reveal the suitable swelling agents to the skilled worker as a function of the polymer material used.

In all of these embodiments of the process of the invention, it can be advantageous for the temperature of the suspension or solvent which comprises the hydrophilic particles to be from −30 to 150° C., preferably from 25 to 100° C., and very particularly preferably from 25 to 49° C., or from 50 to 85° C., or from 86 to 100° C., prior to application to the surface.

The removal of the solvent, or the drying, may take place at room temperature or at an elevated temperature. The drying or the removal of the solvent preferably takes place via heating at a temperature of from 30 to 70° C., preferably from 40 to 60° C.

In another version of the process, the particles are secured to the surface by a process of the invention which comprises the steps of a) applying a liquid or paste-like, curable substance as carrier to a surface, b) applying hydrophilic particles to the carrier, and c) securing the particles by curing the carrier.

Examples of ways of applying the curable substance are application by spray, by doctor, or by spreader or by jet. The thickness at which the curable substance is applied is preferably from 1 to 100 μm, preferably from 5 to 50 μm. Depending on the viscosity of the curable substance, it can be advantageous to permit incipient curing or, respectively, incipient drying of the substance prior to application of the particles. Ideally, the selection of the viscosity of the curable substance is such as to permit at least some extent of sinking of the applied particles into the curable substance, but not to permit drain-off of the curable substance and, respectively, the particles applied thereto if the surface is placed vertically.

The hydrophilic particles may be applied by commonly encountered processes, such as application by spray, or powder application. In particular, the particles may be applied by spray using an electrostatic spray gun. Once the particles have been applied, excess particles, i.e. particles not adhering to the curable substance, may be removed from the surface by shaking, or by being brushed off or blown off. These particles may be collected and reused.

The curable substance used may comprise, as carrier, a lacquer which comprises at least a mixture made from mono- and/or polyunsaturated acrylates and/or methacrylates. The mixing ratios may vary within wide limits. Particular preference is given to a lacquer which can be cured by means of thermal or chemical energy and/or the energy present in light.

The curable substance selected preferably comprises a lacquer or a lacquer system which has hydrophobic properties.

It can be advantageous for the mixtures used as lacquer to comprise compounds having functional groups, e.g. hydroxy groups, epoxy groups, or amine groups, examples being 2,3-epoxypropyl methacrylate and 2-hydroxyethyl acrylate. This is advantageous in particular if the compatibility of lacquer and hydrophilic particles (in relation to hydrophilic properties), for example of Aerosil 200, can be mutually adapted by means of hydrophilic lacquer constituents. Curable substances which may be used are not only acrylic-resin-based lacquers but also polyurethane-based lacquers, and also polyurethane acrylates or silicone acrylates. Other curable substances which may be used are two-component lacquer systems and other reactive lacquer systems. It can be advantageous for the carrier itself, i.e. the lacquer system or adhesive system, to comprise hydrophilic particles.

The particles are secured to the carrier by curing the carrier, preferably using thermal and/or chemical energy and/or the energy present in light, depending on the lacquer system used. An example of a method for curing of the carrier, induced by chemical or thermal energy and/or by the energy present in light, is polymerization or crosslinking of the constituents of the lacquers or, respectively, lacquer systems. The carrier is particularly preferably cured by the energy present in light, and the carrier is particularly preferably polymerized by light from a medium-pressure Hg lamp in the UV region. The carrier is preferably cured under inert gas, very particularly preferably under nitrogen.

Depending on the thickness of the curable substance applied and the diameter of the particles used, it can be necessary to limit the time which expires between application of the particles and curing of the curable substance, in order to avoid complete immersion of the particles into the curable substance. It is preferable for the curable substance to be cured within from 0.1 to 10 min, preferably within from 1 to 5 min, after application of the particles.

In one version of this embodiment of the process of the invention, the carrier system is composed of fixative particles which are solid particles. These are melted to some extent or completely, and the hydrophilic particles are secured to the surface during curing or hardening of the partially molten carrier. This version of the process therefore preferably encompasses the steps of:

I) applying fixative particles and structure-forming particles to a surface, and II) partially melting the fixative particles and then solidifying the carrier formed from the fixative particles in order to secure the structure-forming particles and the carrier on the surface.

The fixative particles and the hydrophilic particles may be applied in succession or simultaneously. It is usual for the fixative particles to be applied to the surface first and then the hydrophilic particles. It can be advantageous for the fixative particles to be partially melted on the surface prior to application of the structure-forming particles, partial melting (or else partial sintering) here meaning the adhesion of fixative particles to their points of contact.

In one particularly preferred embodiment of the process of the invention, a mixture of fixative particles and structure-forming particles is prepared and then applied to the surface. To prepare the mixture of structure-forming particles and fixative particles, it is preferable to use structure-forming particles whose hydrophilic properties are similar to the properties of the fixative particles.

The particles may be applied to the surface in a manner known to the skilled worker, e.g. applied by spray or by powdering. Depending on the use of the article to be provided with a surface having hydrophilic properties, the surface may by this stage have corrosion-protection coatings, paint coatings, or admonitory coatings. The surface or the article may in turn encompass any of the conceivable materials, e.g. polymers, plastics, metals, woods, natural substances, ceramics, or glasses. The only limitation on use is the heat resistance of the articles or surfaces. In this embodiment of the process of the invention, therefore, articles to be treated must be thermally stable in the region of the melting point of the fixative particles.

The incipient melting of the invention takes place as result of brief heating, incipient melting (or incipient sintering) meaning softening of the fixative particles in such a way that, after cooling, the surface of the fixative particles adheres at least to some extent to adjacent surfaces of fixative particles and/or hydrophilic particles, and also to the surface of the article which is to be provided with a self-cleaning surface. The adhesion may be produced by chemical bonding or else by physical forces.

The selection of the temperature at which the incipient melting is brought about, and also the selection of the duration of the incipient melting process, is preferably such as to give only some extent of melting of the fixative particles, so that the hydrophilic particles remain on the surface.

The method used for heating may be one known to the skilled worker, e.g. use of an oven or any other source of heat. The method preferably used for heating is infrared radiation. However, it can also be advantageous for a mixture made from at least fixative particles and hydrophilic particles, or the fixative particles alone, to be applied to a heated surface which is cooled after the application process. This can be advantageous in particular when the nature of the surface of the article itself is such that the mixture applied does not remain in a stable manner on this surface. Examples of reasons for this may be found in the geometry of the article or else in insufficient adhesion of the pulverulent coating agent (fixative particles or hydrophilic particles) to the substrate.

The mixture used in the preferred embodiment and comprising at least fixative particles and hydrophilic particles preferably comprises from 10 to 90% by weight of hydrophilic particles and from 90 to 10% by weight of fixative particles. The mixture used particularly preferably comprises from 25 to 75% by weight of hydrophilic particles and from 25 to 75% by weight of fixative particles. The mixture may be prepared simply by mixing the solids. However, mixers familiar to the skilled worker may also be used for the mixing process. It can be advantageous for the mixing to take place with heating, the current consumed by the mixer being monitored. When agglomeration begins, this being readily detectable from a rise in the current consumed, the mixture is recooled. By this stage, the result of the slight heating is that there is at least some extent of secure bonding of the hydrophilic particles to the fixative particles, without encapsulation of the hydrophilic particles by the melt of the fixative with the possible result of loss of the hydrophilic properties of the hydrophilic particles. The advantage of heating the particles during the mixing process is that agglomeration produces larger particles in the mixture mentioned and these are easier to process, since when the mixture is applied to the surface by spraying or powdering, dusting is substantially prevented and it becomes impossible for demixing to take place as a result of mechanical effects, e.g. differing densities of fixative particles and hydrophilic particles.

The average size of the fixative particles used according to the invention is preferably less than 50 µm. The average size of the fixative particles is preferably the same as the size of the hydrophilic particles. It can also be advantageous for the average size of the fixative particles to be smaller than that of the hydrophilic particles by from 10 to 70%, preferably from 25 to 50%.

The fixatives used as fixative particles are preferably compounds selected from the group consisting of hot-melt adhesives and powder coatings. These hot-melt adhesives and/or powder coatings preferably comprise at least one compound selected from ethylene-ethyl acrylate copolymers, ethylene-vinyl acetate copolymers, polyamides, polyether sulfones, polyisobutenes, epoxy resins and polyvinyl butyrals.

The process of the invention can produce articles which have, on at least one side or surface, a surface of the invention. Articles which have, on at least one surface, a surface of the invention with hydrophilic properties may be fibers or cleaning textiles, for example, and these fibers may be used for producing textiles. In particular, cleaning textiles which have surfaces of the invention, or fibers with surfaces of the invention, have markedly better water absorption and therefore are markedly easier to use.

It is also possible for sponges or foams to be equipped with the surface of the invention, both externally and also in the open pores. The advantages of these foams or sponges used as cleaning aids are the same as those of the cleaning textiles described above. Other possible uses for these foams or sponges are their use as water retainers, e.g. for flower arrangements, for example, or else as absorbers.

Another use of hydrophilic surfaces is found in internals of distillation columns, reactors, or dehumidifiers. The good wettability of internals which have hydrophilic surfaces of the invention improves condensation of water vapor on the internals and therefore increases effectiveness.

The process of the invention is described using the FIGS. 1a to 3b, but there is no intention that the invention be restricted thereto. FIGS. 1a and 1b depict scanning electron micrographs (SEMS) of a polycarbonate sheet coated with hydrophilic silica, at different magnifications. FIGS. 2a and 2b show SEMs of a polyvinyl chloride (PVC) sponge, at different magnifications. FIG. 2a clearly shows the pore structure of the sponge.

Figure 3A:
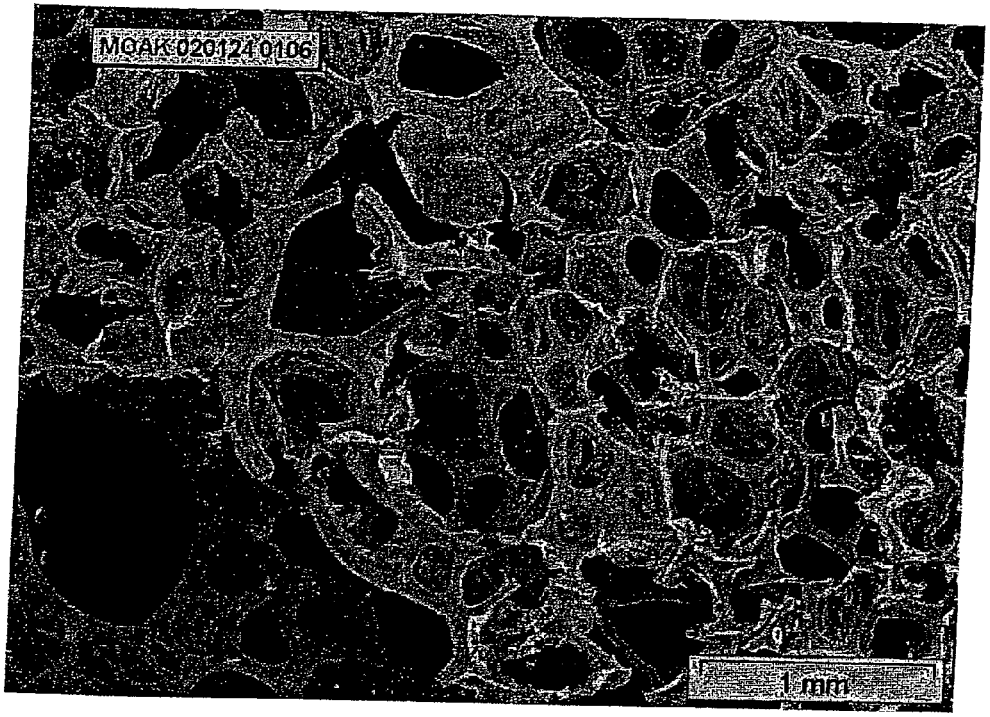
Figure 3B:
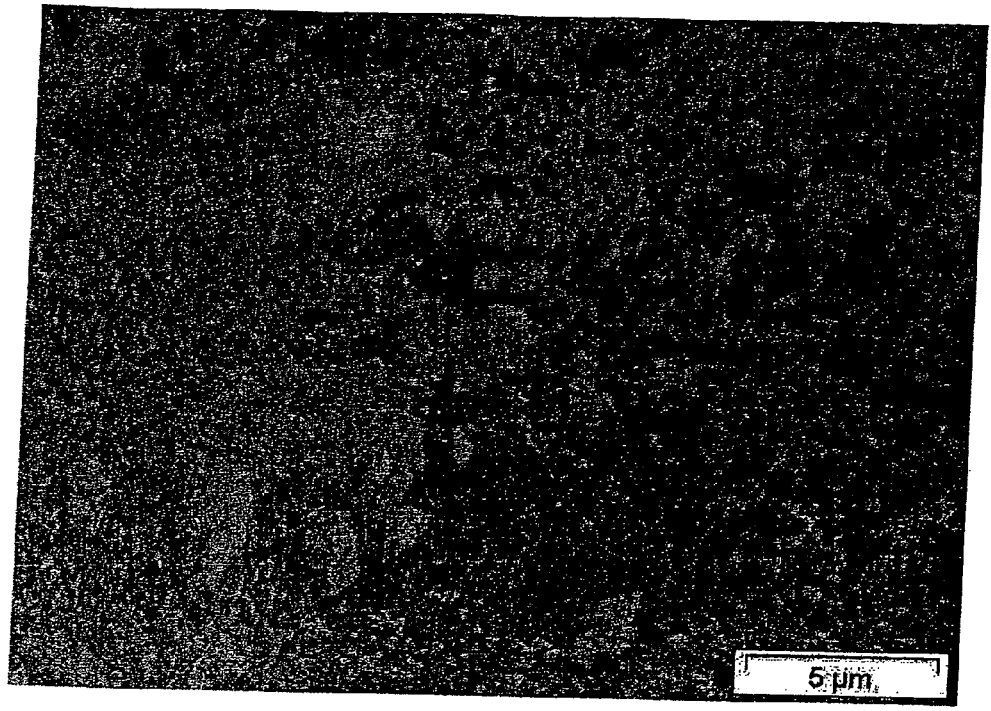

FIGS. 3a and 3b show a PVC sponge equipped with hydrophilic silica as in example 2, at different resolution levels. In FIG. 3b in particular it can be seen that the hydrophilic particles become embedded into the surfaces of the pores.

The example below is an example of the process of the invention, but there is no intention that the invention be restricted thereto.

EXAMPLE 1

A polycarbonate sheet is dipped into a suspension made from a hydrophilic silica with an average primary particle size of 12 nm and a BET surface area of 200 $m^2/g$ (Aerosil 200, Degussa AG) and acetone, comprising 1% by weight of silica. During this process, the primary particles become embedded into the solvated polymer matrix, and once the acetone has evaporated have been anchored securely in the surface. This coating is wipe-resistant. The contact angle of a droplet of liquid (water) on this surface cannot be determined since it spreads immediately. FIGS. 1a and b show SEMs of a surface produced as in example 1, in different magnifications.

EXAMPLE 2

Figure 2A:
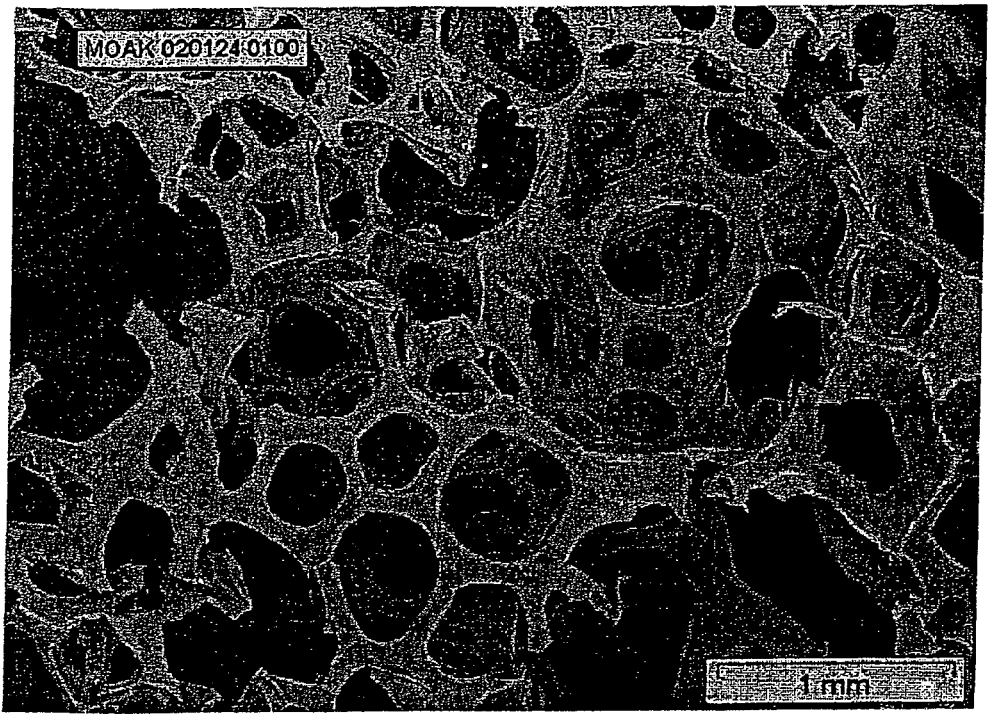
Figure 2B:
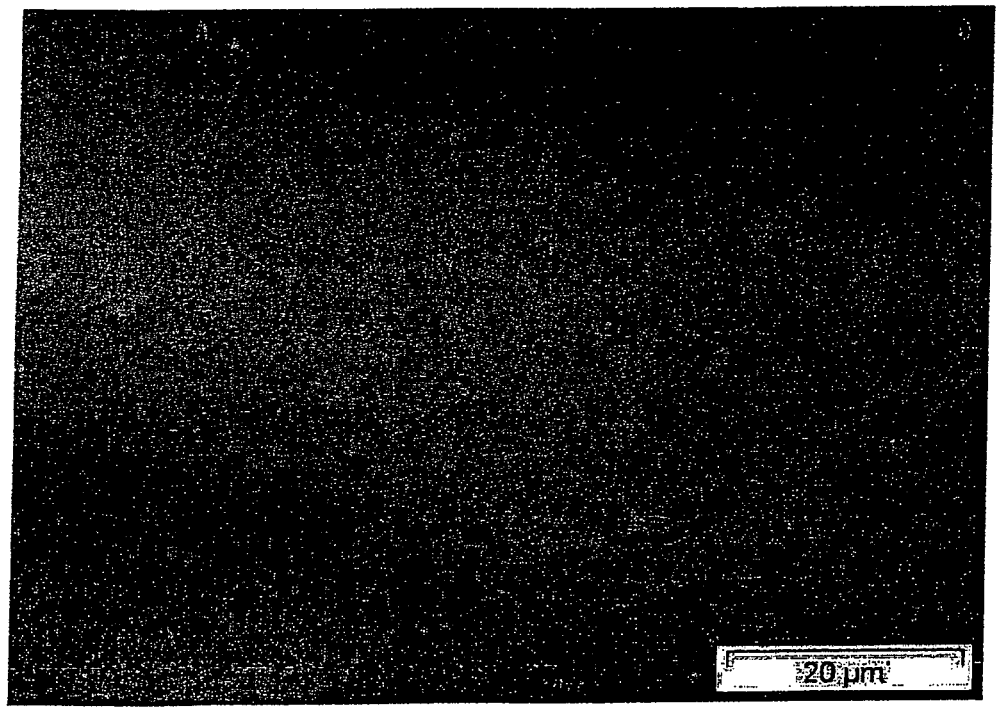

A commercially available PVC (polyvinyl chloride) sponge is dipped into a suspension made from a hydrophilic silica with an average primary particle size of 12 nm and a BET surface area of 200 $m^2/g$ (Aerosil 200, Degussa AG) and hexane, comprising 1% by weight of silica. During this process, the primary particles become embedded into the solvated polymer matrix, and once the hexane has evaporated have been anchored securely in the surface. FIGS. 2a and 2b show SEMs of a sponge used in example 2. FIGS. 3a and 3b show SEMs of the PVC sponge treated as in example 2. It can clearly be seen that there is no destruction of the pores by the solvent, and the primary particles become embedded into the polymer.

Compared with an uncoated sponge, a hydrophilic sponge absorbs a liquid much more rapidly. The hydrophilic sponge produced according to the invention requires 10 s to absorb sufficient water spontaneously so that it becomes completely immersed in a water bath. The untreated commercially available PVC sponge needs 1.5 hours to achieve this.

What is claimed is:

1. An textile having water retention capacity and at least one surface, characterized as hydrophilic, which surface consists of permanently affixed fumed hydrophilic silica particles, wherein the fumed hydrophilic silica particles have a Brunauer, Emmett, Teller (BET) surface area of from 50 to 600 $m^2/g$. and an average particle size of from 1 nm to 20 µm anchored in the surface or secured in a carrier layer forming the hydrophilic surface where the hydrophilic surface promotes water absorption and wherein the permanently affixed fumed hydrophilic silica particles are embedded, which results from a solvation or swelling process.

2. The textile of claim 1, wherein the textile is a cleaning textile.

3. The textile of claim 1, wherein the carrier layer comprises a curable substance.

4. The textile as claimed in claim 1, wherein the article is a cleaning aid including a sponge.

5. The textile as claimed in claim 1, wherein the article is a polymeric sheet composed of a polycarbonate.

* * * * *